Aug. 11, 1925. 1,549,509
G. SCHLUESSELBURG
ROLLER FOR ROLLER SKATES AND THE LIKE
Filed April 9, 1923
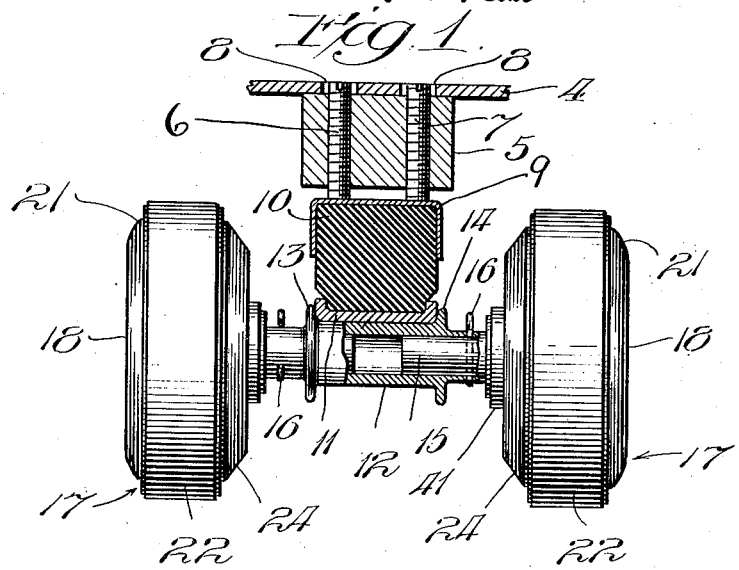
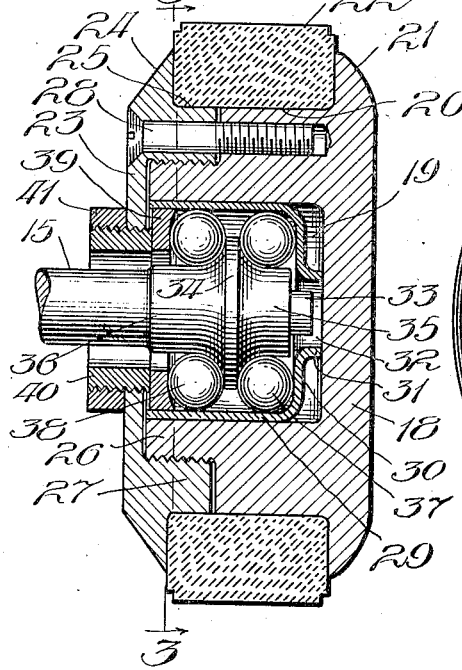
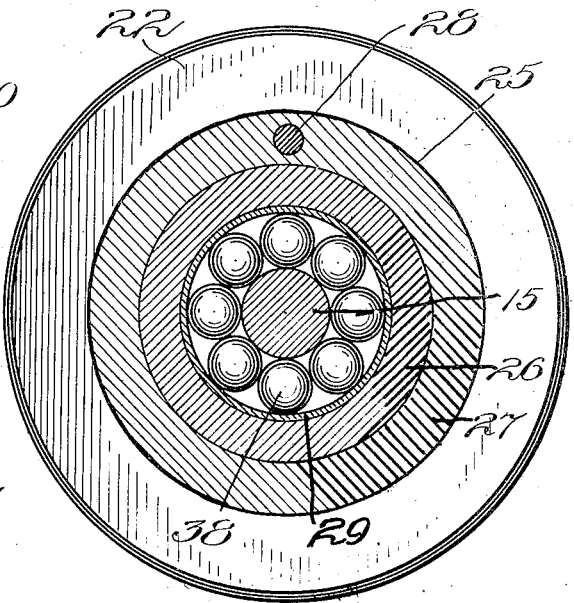
Inventor:
George Schluesselburg
by
Attys Patented Aug. 11, 1925.

1,549,509

UNITED STATES PATENT OFFICE.

GEORGE SCHLUESSELBURG, OF CHICAGO, ILLINOIS, ASSIGNOR OF ONE-HALF TO P. T. HARMON, OF CHICAGO, ILLINOIS.

ROLLER FOR ROLLER SKATES AND THE LIKE.

Application filed April 9, 1923. Serial No. 630,746.

*To all whom it may concern:*

Be it known that I, GEORGE SCHLUESSELBURG, a citizen of the German Republic, residing at Chicago, in the county of Cook and State of Illinois, have invented certain new and useful Improvements in Rollers for Roller Skates and the like, of which the following is a specification.

The present invention has to do with improvements in rollers for roller skates and the like. While the construction herein disclosed is particularly well adapted for use in connection with rollers for roller skates, the features of the invention may also be used to advantage for other purposes, and, therefore, I do not intend to limit the same to rollers for roller skates, except as I may do so in the claims. Nevertheless, in view of the fact that the construction herein disclosed is particularly well adapted for this class of service, I have illustrated and will describe the same as so used in particularity.

One of the objects of the invention is to provide a roller of such construction that it may be provided with a removable tread of material which is especially suited for use to establish the bearing surface. In this connection, a further object is to provide a construction such that the roller itself can be readily set together or taken apart without the need of using special tools, so as to make it possible to easily insert or adjust the wearing element.

Another object of the invention is to provide a bearing support and mounting for the roller which is of very simple arrangement and construction and can be readily adjusted in order to operate to best advantage notwithstanding the wear which takes place in service. In this connection, it is also possible to adjust the bearing so as to avoid binding or jamming due to expansion or contraction of the parts with change of temperature.

A further object of the invention is to provide a very convenient and simple mounting and support for the bearing, so that the rollers and bearings can be readily set into place or removed from the hanger of the roller skate.

Other objects and uses of the invention will appear from a detailed description of the same, which consists in the feature of construction and combinations of parts hereinafter described and claimed.

In the drawing:

Figure 1 shows a vertical section through a portion of a roller skate having the hanger thereof provided with bearings and rollers embodying the features of the invention;

Fig. 2 shows a vertical section on enlarged scale through one of the rollers and its bearing; and Fig. 3 shows a transverse section taken on the line 3—3 of Fig. 2, looking in the direction of the arrows.

In the construction shown in the drawing, the platform of the skate is designated by the numeral 4. I have not shown the construction of the hanger in detail, but will state that the same includes a thrust block 5 which sets against the lower face of the platform 4 and within which are located a pair of set screws 6 and 7 which can be adjusted by a screw driver working through the holes 8 of the platform.

The screws 6 and 7 bear against a plate 9 which sets against the top surface of a block 10 of yieldable material, and the lower portion of said block bears against a thrust block 11 which rests upon the top of an axle housing 12. This axle housing has the flanges 13 and 14 which embrace between them the block 11.

Into each end of the axle housing 12 is set a short bearing shaft 15. The bearing shaft is held in place in any convenient manner, as by means of a cotter pin 16 which is passed through the end portion of the housing and through the axle shaft.

The roller is designated in its entirety by the numeral 17. It includes a circular body block 18 which has a central circular recess or socket 19 facing towards the interior. The body block 18 is also provided with an annular shoulder 20 and the peripheral outstanding flange 21 at its outer side, so that the wearing ring or tread ring 22 can be set into place on the shoulder and against the flange 21.

This tread 22 may be made of any suitable material such as fiber or composition, and I do not herein particularly concern myself with its exact composition.

A circular flange plate 23 is adapted to co-operate with the inner end of the block 18 in order to retain the tread 22 in place. For this purpose, the flange plate 23 has the annular peripheral flange 24 which reaches out far enough to embrace the inner side face of the tread 22. It is also preferred that the flange plate 23 have an inwardly reaching shoulder 25 which is of the same size as the shoulder 20 and serves to support a portion of the tread 22.

The flange plate 23 can be held in place with respect to the body block 18 in any convenient manner, but the arrangement illustrated is the preferred form. This includes a neck 26 which reaches inwardly from the body block 18 and is threaded on its outer surfaces. The flange plate 23 has a neck 27 reaching inwardly and overlying the neck 26 to which it is threaded. By rotating the flange plate 23 the tread block 22 is clamped in place. A set screw 28 can be passed through the flange plate 23 and into the body block 18 so as to prevent the parts from turning with respect to each other after the tread block is locked in place.

The recess or socket 19 is preferably surfaced with a hard steel surfacing 29 in the form of a section of steel tubing which is forced into the socket under a driving fit. This lining 29 has its inner end 30 turned in at right angles so as to establish an end wall, and the central portion of this end wall is preferably turned out again as shown at 31 so as to establish a relatively small recess 32 at the inner end of the lining.

The axle 15 has on its extreme end a lug 33 which sets into the recess 32, but does not bear against the same and allows a free movement of oil or other lubricant around the parts.

The shaft 15 is also provided with a peripheral flange 34 at the two sides of which are formed the ball bearing raceways 35 and 36 respectively. The two sets of ball bearings 37 and 38 respectively travel in these raceways.

A thrust block 39 in the form of a ring of hard metal sets against the ball bearing 38; and a nipple 40 is threaded through the flange plate 23 and bears against the outer surface of the ring 39. By turning this nipple the ring 39 can be forced up towards the ball bearing 38, and all of the parts drawn into proper engagement with respect to each other. A lock nut 41 is placed on the outer end of the nipple 40, which lock nut can be tightened up against the outer surface of the flange plate 23 in order to lock the nipple in place.

Examination of Fig. 2 will show that each of the balls of both of the ball bearings has a three point support, two of the points of support being on the roller or elements which turn therewith, and the other point of support being on the axle shaft or elements which are rigid with respect thereto. Furthermore, the arrangement is such that the balls also act to take up end thrust and prevent the roller from either coming off of the axle or being forced inwardly with respect thereto.

While I have herein shown and described only a single embodiment of the features of my present invention, still I do not limit myself to the same except as I may do so in the claims.

I claim:

1. In a device of the class described, the combination of a shaft having on its end portion a pair of oppositely disposed ball bearing raceways together with an annular outwardly reaching flange between said raceways, a circular body block having a peripheral flange at one side and having at the other side an inwardly extending central circular recess of larger size than the flange of the shaft, said recess being of sufficient depth to fully accommodate both of the ball bearing raceways of the shaft, a lining of hard metal tubing on the surface of said recess, the inner end of said lining being carried down and overlying the marginal portion of the end wall of the recess, balls between both of the raceways and the lining aforesaid, the balls at the innermost raceway working against both the peripheral and end portions of the lining aforesaid, a hard metal thrust block working against the side faces of the balls of the outermost raceway, a flange plate threaded onto the other side of the body block, means for retaining the two elements in co-operative relationship with respect to each other, and means in conjunction with the flange plate for engaging the thrust block under adjustment, substantially as described.

2. In a device of the class described, the combination of a shaft, having on its end portion a pair of oppositely disposed ball bearing raceways together with an annular outwardly reaching flange between said raceways, a circular body block having an inwardly extending central circular recess of larger size than the flange of the shaft, said recess being of sufficient depth to fully accommodate both of the ball bearing raceways of the shaft, balls between both of the raceways and the surface of the recess, the balls at the innermost raceway working against both the peripheral and end portions of the recess, a thrust block working against the side faces of the balls of the outermost raceway, a flange plate secured to the body block at the side of said thrust block, and means in conjunction with said flange plate for engaging the thrust block under adjustment, substantially as described.

3. In a device of the class described, the combination of a shaft, a circular body block having a peripheral flange at one side together with a backwardly facing shoulder at the inner side of said flange, a flange plate threaded onto the other side of the body block, said flange plate having a peripheral flange facing the flange of the body block and also having a shoulder adjacent to said flange and in alignment with the shoulder of the body block, a circular tread seated upon the aligned shoulders of the body block and flange plate, whereby said tread may be clamped between the flanges of the two elements when said elements are threaded together, means for retaining the elements in co-operative relationship and against unthreading, and suitable ball bearings between the shaft and body block, substantially as described.

GEORGE SCHLUESSELBURG.